United States Patent
Nakabayashi et al.

[11] Patent Number: 5,993,959
[45] Date of Patent: Nov. 30, 1999

[54] BINDING TAPE PAPER AND BINDING TAPE USING THE PAPER

[75] Inventors: Masahito Nakabayashi; Yasuyuki Amano; Tomoyuki Uchida, all of Saitama-ken, Japan

[73] Assignee: Lintec Corporation, Japan

[21] Appl. No.: 08/871,174

[22] Filed: Jun. 9, 1997

[30] Foreign Application Priority Data

Jun. 10, 1996 [JP] Japan .................................. 8-170604

[51] Int. Cl.⁶ .............................. B32B 7/12; B32B 23/08; B32B 29/00; D21F 11/00
[52] U.S. Cl. ......................... 428/343; 428/352; 428/401; 428/425.1; 428/478.4; 428/479.3; 428/481; 428/498; 428/507; 428/511; 428/537.5; 162/146; 162/157.3
[58] Field of Search .................................. 428/41.8, 401, 428/480, 537.5, 481, 343, 352, 423.1, 425.1, 474.4, 478.4, 479.3, 497, 498, 500, 507, 511, 522; 162/146, 157.3

[56] References Cited

U.S. PATENT DOCUMENTS

| | | | |
|---|---|---|---|
| 3,489,643 | 1/1970 | Hoffman | 162/146 |
| 3,630,201 | 12/1971 | Endres | 128/287 |
| 4,100,324 | 7/1978 | Anderson et al. | 428/288 |
| 4,571,360 | 2/1986 | Brown et al. | 428/318.4 |
| 5,106,457 | 4/1992 | Manning | 162/115 |
| 5,223,095 | 6/1993 | Kinsley, Jr. | 162/146 |
| 5,387,319 | 2/1995 | Mora et al. | 162/146 |
| 5,679,428 | 10/1997 | Sawada et al. | 428/42.2 |

FOREIGN PATENT DOCUMENTS

| | | |
|---|---|---|
| 8-39959 | 2/1997 | Japan . |
| 9-136496 | 5/1997 | Japan . |

*Primary Examiner*—Paul Thibodeau
*Assistant Examiner*—Holly C. Rickman
*Attorney, Agent, or Firm*—Brinks Hofer Gilson & Lione; G. Peter Nichols

[57] ABSTRACT

A binding tape is constructed from a binding tape paper, an pressure sensitive adhesive layer formed on one side of the binding tape paper, and a release sheet stuck to the pressure sensitive adhesive layer. The binding tape paper is made from a composite paper which includes a pulp at 30–70 parts by weight and synthetic resin fibers at 30–70 parts by weight, in which the synthetic resin fibers have a fineness of 0.4–3.0 deniers and a fiber length of 3–10 mm. The binding tape is formed by cutting the binding tape paper such that the machine direction of the composite paper is directed to the lengthwise direction of the respective binding tape.

13 Claims, 2 Drawing Sheets

BINDING TAPE PAPER AND BINDING TAPE USING THE PAPER

BACKGROUND OF THE INVENTION

1. Field of the Invention

The present invention relates to a binding tape paper and a binding tape using the binding tape paper for binding documents and the like.

2. Description of the Prior Art

Recently, a binding tape made of paper has been developed as a means for binding documents or the like and which can be used in place of metal staples. One of the examples of such a binding tape is disclosed in Japanese Laid-open Patent Publication No. HEI 8-39959. This binding tape is precut to a predetermined specific length and has a pressure-sensitive adhesive applied to the back surface thereof. This binding tape is used by passing it through binding holes formed in documents so as to form a single wrap or a partial wrap with the pressure-sensitive adhesive side facing inwardly.

This kind of binding tape has been developed with such factors as safety and ease of disposal taken into consideration, but due to its purpose of use, such binding tape needs to have sufficient strength to prevent a bound document from coming apart.

In the case where the binding tape is made from synthetic resin, it is possible to obtain a high degree of strength, but this in turn leads to environmental problems when disposing of such tape, especially in the case where an incineration process is carried out for disposing of the tape. On the other hand, in the case where the binding tape is made from cloth, it is possible to eliminate such disposal problems, but this in turn leads to disadvantages that a thickness of the tape is increased and a manufacturing cost thereof becomes higher.

In this connection, even though the problems mentioned above can be avoided by using binding tape made of paper, there is a problem in such a paper binding tape that it is easily to tear due to the weak levels of tensile strength and tearing strength thereof.

SUMMARY OF THE INVENTION

With a view toward overcoming the problems of the prior art mentioned above, it is an object of the present invention to provide a binding tape paper and a binding tape using the binding paper which have a high degree of strength and are hard to tear.

In order to achieve the object, a binding tape paper according to the present invention is formed from a composite paper which includes 30–70 parts by weight of pulp; and 30–70 parts by weight of synthetic resin fibers having a fineness of 0.4–3.0 deniers and a fiber length of 3–10 mm, wherein the machine direction of the composite paper defines the lengthwise direction of the binding tape paper.

According to the binding tape as described above, it is possible to provide a binding tape paper and a binding tape provided with the paper which are strong, resistant to breakage and easy to dispose of.

In the present invention, it is preferred that the composite paper is impregnated with or coated with a high molecular organic compound for increasing its strength.

Further, it is preferred that the synthetic resin fibers are comprised of polyester-based resin.

Furthermore, in the present invention it is preferred that the breaking length in the machine direction is 8 km or higher.

Furthermore, it is also preferred that the ratio LMD/LCD between the breaking length in the machine direction LMD and the breaking length in the cross direction LCD which is orthogonal to the machine direction is greater than or equal to 2.5.

Moreover, in the present invention, it is preferred that the tear factor in the direction orthogonal to the machine direction is greater than or equal to 100.

Another aspect of the present invention is directed to a binding tape, comprising:

a binding tape paper which is formed from a composite paper including 30–70 parts by weight of pulp, and 30–70 parts by weight of synthetic resin fibers having a fineness of 0.4–3.0 deniers and a fiber length of 3–10 mm, wherein the machine direction of the composite paper defines the lengthwise direction of the binding tape paper; and a pressure sensitive adhesive layer provided on one side of the binding tape paper.

In this case, it is preferred that the binding tape paper is cut so that the machine direction of the binding tape paper is directed to the lengthwise direction of the binding tape.

Further, it is also preferred that a release sheet attached to the pressure-sensitive adhesive layer.

Other objects, structures and advantages of the present invention will be apparent when the following description of the drawings is taken into consideration in conjunction with the appended drawings.

DETAILED DESCRIPTION OF THE PREFERRED EMBODIMENTS

With reference to the appended drawings, a detailed description of the preferred embodiments of the binding tape paper and the binding tape using the binding paper according to the present invention will now be given below.

Figure 1:
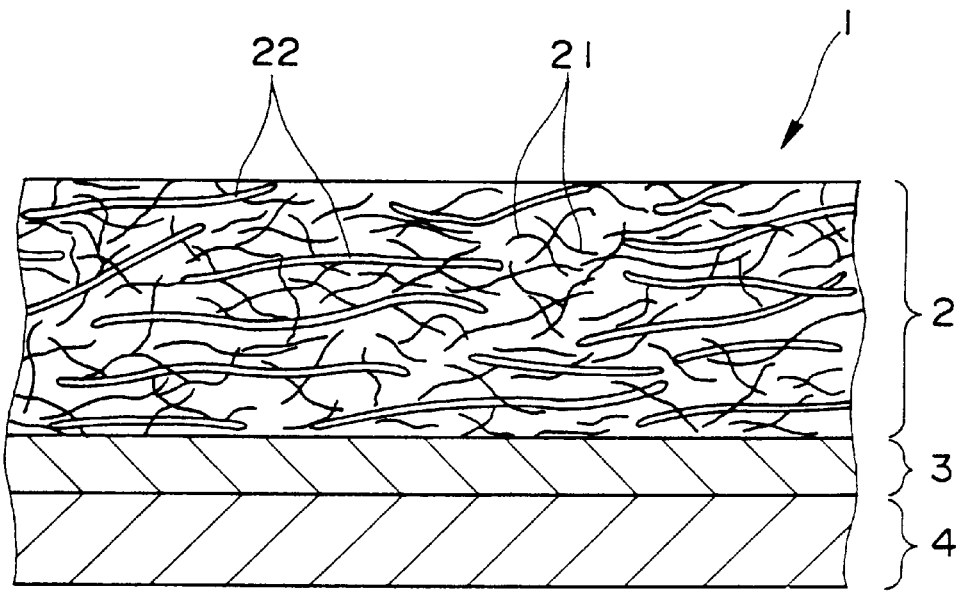
FIG. 1 is a cross-sectional view of an embodiment of a binding tape paper according to the present invention.
Figure 2:
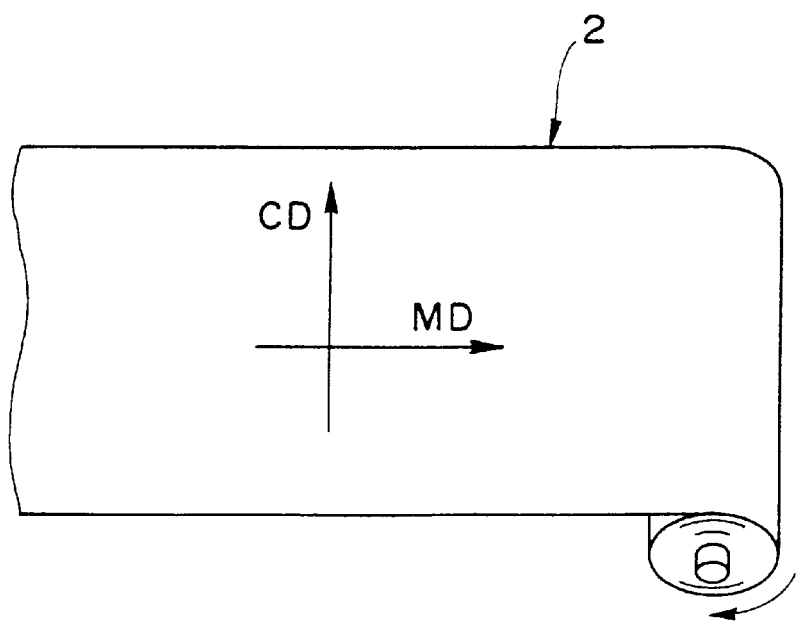
FIG. 2 is a perspective view showing the machine direction MD and the cross direction CD (the direction orthogonal to the MD) of the binding tape paper according to the present invention.

FIG. 1 is a cross-sectional view of an embodiment of a binding tape 1 according to the present invention. As shown in this figure, the binding tape 1 according to the present invention is constructed from a binding tape paper 2 made of a composite paper (paper made from pulp and synthetic resin fibers), a pressure-sensitive adhesive layer 3 formed on one side of the binding tape paper 2, and a release sheet 4 which is stuck to the pressure-sensitive adhesive layer 3.

In more detail, the binding tape paper 2 is made from a composite paper which includes a pulp 21 and synthetic resin fibers 22. The presence of the synthetic fibers 22 gives the binding tape paper 2 a large tensile strength and tearing strength. In this case, as shown in the drawing, the synthetic resin fibers 22 have a tendency to orientate themselves with the machine direction (MD) of the composite paper, and this improves the tensile strength in the machine direction and the tearing strength in the cross direction (CD; i.e., the direction orthogonal to the machine direction). Accordingly, the binding tape 1 is used such that the machine direction of the composite paper is directed to the lengthwise direction of the binding tape 1.

The pulp 21 of the composite paper may include wood pulp such as soft wood pulp and hard wood pulp; non-wood fibers such as Manila Hemp, Mitsumata (paperbush/Edgeworthia Chrysantha Lindley), Kouzo (paper mulberry/Broussonetia Kazinoki Sieb) and Kenaf (Hibiscus canabinus L.); or any mixture thereof. In this case, in order to improve the tensile strength and tearing strength of the binding tape 1, the major component of such mixture should preferably be soft wood pulp (in particular, a mixture containing a soft wood pulp of 50% or greater).

Further, the amount of pulp 21 contained in the composite paper is 30%–70% by weight, with the preferred range being 50%–60% by weight. If the amount of pulp 21 falls below 30% by weight, the paper making properties will deteriorate. On the other hand, if the amount of pulp 21 exceeds 70% by weight, the tensile strength and tearing strength of the binding tape 1 will go down due to the relatively small amount of synthetic resin fibers contained therein.

Examples of materials for the synthetic resin fibers 22 contained in the composite paper include polyester resins such as polyethylene terephthalate and polybutylene terephthalate, polyolefines such as polyethylene and polypropylene, acrylic resin, polyamide, vinylon and polyvinyl chloride. Among these materials, polyester resin is considered to be the most preferred material since a composite paper containing polyester resin is particularly easy to be processed in a paper machine processability.

Further, the fineness of the synthetic resin fibers 22 should be about 0.4–3.0 deniers, with a more preferred range being about 1.0–2.0 deniers. If the fineness of the synthetic resin fibers 22 is less than 0.4 deniers, it may not be possible to obtain sufficient tensile strength and tearing strength depending on kinds of synthetic resins. On the other hand, if the fineness exceeds 3.0 deniers, the paper making properties goes down.

Further, the length of the synthetic resin fibers 22 should be about 3 mm–10 mm, with a more preferred range being about 3 mm–7 mm. If the length of the synthetic resin fibers 22 is less than 3 mm, it may not be possible to obtain sufficient tensile strength and tearing strength depending on kinds of synthetic resins. On the other hand, if the length of the synthetic resin fibers 22 exceeds 10 mm, the strength will go down and the rigidity will go up due to the paper making properties being decreased.

Further, the amount of the synthetic resin fiber 22 contained in the composite paper is 30%–70% by weight, with the preferred range being 40%–50% by weight. If the amount of synthetic resin fiber 22 falls below 30% by weight, it may not be possible to obtain sufficient tensile strength and tearing strength. On the other hand, if the amount of synthetic resin fiber 22 exceeds 70% by weight, the paper making properties will go down.

Further, the binding tape paper 2 which is made from the composite paper described above should preferably include an additive. Examples of the additives that can be used include neutralizers, fixers, mucilage, sizing agents, wet strength agents, dry strength agents, antifoaming agents, fillers, dyestaffs and pigments and the like. These additives can be used either alone or in any combination of two or more substances.

In this connection, a mucilage can be added to achieve a uniform distribution of the pulp 21 and the synthetic resin fibers 22. Examples of substances which can be used as the mucilage include polyethylene oxide resin and polyacrylic amide resin.

Examples of the wet strength agent for improving the wet strength of the composite paper include synthetic resins such as epoxy resin, urea resin, melamine resin and phenol resin.

There is no restriction as to the amount of the additives which can be used. However, it is preferred that the amount of additives lies within the range of 0.3–3.0 parts by weight with respect to 100 parts by weight of pulp, with the most preferred range being 0.5–1.0 parts by weight.

Further, the binding tape paper 2 made of the composite paper is preferably impregnated with a high molecular organic compound to increase the strength thereof. In this way, it is possible to further improve the tensile strength and tearing strength (tear factor) of the composite paper.

Examples of such a high molecular organic compound include various synthetic resins such as acrylic resin, vinyl acetate resin, polyurethane resin, polyamide resin, polyvinyl alcohol, vinyl chloride resin and the like, various rubbers such as styrene-butadiene rubber (SBR), nitril-butadiene rubber (NBR), methyl methacrylate-butadiene rubber (MBR) and the like, rosins, gelatin, starch and the like. In this case, either alone or in combinations of two or more compounds mentioned in the above can be used. In view of strength of the paper, the most preferred of these compounds are acrylic resin, vinyl acetate resin, polyurethane resin, SBR, NBR and MBR.

Further, the application and impregnation of this kind of high molecular organic compound is preferably carried out using a size press which is to be carried out after normal paper machine process. In this way, it is possible to carry out impregnation of the high molecular organic compound without having to add an additional manufacturing step. In this case, the impregnation solution may also contain other compounds such as water retaining agents, waterproofing agents, dyestuffs, pigments and the like.

While there is no specific restriction as to the amount of high molecular organic compound allowed for impregnation, the preferred range is 5–20 $g/m^2$, with the most preferred range being 8–15 $g/m^2$.

As shown in FIG. 1, a pressure-sensitive adhesive layer 3 is formed on one side of the binding tape paper 2.

The pressure-sensitive adhesive layer 3 is mainly formed of a pressure-sensitive adhesive (pressure-sensitive adhesive compound). Examples of such a pressure-sensitive adhesive (pressure-sensitive adhesive compound) include rubber-based pressure-sensitive adhesives, acrylic-based pressure-sensitive adhesives, silicone-based pressure-sensitive adhesives and the like. Among these adhesives, acrylic-based pressure-sensitive adhesive is the most preferred.

Acrylic-based pressure-sensitive adhesives can be made from polymers or copolymers which mainly include a main monomer component of low Tg for imparting pressure-sensitive adhesive properties, a comonomer component of high Tg for imparting adhesive properties and cohesive strength, and a functional group containing monomer for cross-linking and improving adhesive properties.

Examples of such a main monomer component include alkyl esters of acrylic acid such as ethyl acrylate, butyl acrylate, amyl acrylate, 2-ethylhexyl acrylate, octyl acrylate, cyclohexyl acrylate and benzyl acrylate and the like; and alkyl esters of methacrylic acid such as butyl methacrylate, 2-ethylhexyl methacrylate, cyclohexyl methacrylate and benzyl methacrylate and the like.

Examples of the comonomer component include methyl acrylate, methyl methacrylate, ethyl methacrylate, vinyl acetate, styrene, acrylonitrile and the like.

Examples of the functional group containing monomer component include carboxylic acid group containing monomers such as acrylic acid, methacrylic acid, maleic acid, itaconic acid and the like; hydroxyl group containing monomers such as 2-hydroxyethyl(meth)acrylate, 2-hydroxypropyl(meth)acrylate and N-methylolacrylamide, acrylamide, methacrylamide, glycidyl methacrylate and the like.

These materials are preferred because, in addition to having excellent adhesive strength and cohesive strength, they have high stability when exposed to light and oxygen. Further, by selecting an appropriate type and molecular weight for the monomer, they make it possible to obtain any desired quality or characteristic in accordance with the intended use thereof.

Examples of the rubber-based pressure-sensitive adhesives mainly include natural rubber based adhesive, isoprene rubber based adhesive, styrene-butadiene rubber based adhesive, recycled rubber based adhesive, polyisobutylene based adhesive and the like, and block copolymers containing rubbers such as styrene-isoprene-styrene, styrene-butadiene-styrene and the like.

Examples of the silicon-based pressure-sensitive adhesives include dimethyl siloxane, diphenyl siloxane and the like.

The adhesive described above may be either a non-cross-linking type adhesive or a cross-linking type adhesive. In the latter case, a cross-linking agent is added when necessary. Examples of such a cross-linking agent include epoxy-based compounds, isocyanate-based compounds, metal chelate compounds, metal alkoxides, metallic salts, amine compounds, hydrazine compounds, aldehyde-based compounds and the like.

This kind of adhesive may be either an organic solvent based adhesive or an emulsion based adhesive.

Further, additives may be added to the pressure sensitive adhesive layer 3, if necessary. Examples of such additives includes plasticizers, tackifiers, thickeners (viscosity improver), fillers, anti-aging agents, preservatives, mildew-proofing agents, dyestuffs and pigments and the like.

As shown in FIG. 1, a release sheet 4 is stuck to the pressure sensitive adhesive layer 3.

As for the release sheet 4, various materials can be used. Examples of the materials which can be used for a substrate of the release sheet include films made from various resins such as polyethylene terephthalate, polybutylene terephthalate, polyethylene, polypropylene, polyarylate and the like; and various paper materials such as polyethylene laminated paper, clay coating paper, glassine paper, recycled paper and the like. These materials are used after surface treatment by releasing agent being carried out onto the surface of the substrate which is to be attached to the pressure-sensitive adhesive layer 3.

In this case, examples of the surface treatment include the application of a release agent such as silicon resins, long chain alkyl resins, fluorine resins and the like.

Now, according to the present invention, it is preferred that the binding tape paper 2 has the strength described below.

The breaking length (fracture length) LMD in the Machine Direction MD of the binding tape paper 2 should preferably be above 8 km, and more preferably above 10 km. If the breaking length LMD is less than 8 km, the tensile strength in the lengthwise direction will not be sufficient in the case where a relatively narrow binding tape is manufactured, and this will make it easy for such a narrow binding tape to break during use.

The relationship between the breaking length LMD in the machine direction MD of the binding tape paper 2 and the breaking length LCD in the cross direction which is orthogonal to the machine direction MD, that is length to breadth breaking strength ratio LMD/LCD, is preferably LMD/LCD≧2.5, and more preferably LMD/LCD≧3.0.

In this connection, in accordance with Japanese Industrial Standard JIS P 8113, the breaking strength is defined by the following formula:

$$\text{Breaking Strength [km]} = \\ \text{Tensile Strength [kgf]} / (\text{breadth of test sheet [mm]} \times \\ \text{basis weight of the test sheet [g/m}^2\text{]}) \times 1000$$

Further, the tear factor (relative tearing strength) in the cross direction CD of the binding tape paper 2 which is the direction orthogonal to the machine direction MD should preferably be above 100, and more preferably above 150. If this tear factor is below 100, the binding tape paper 2 will break easily. Further, it is also preferred that the tear factor (relative tearing strength) in the machine direction MD be above 100.

In this connection, in accordance with Japanese Industrial Standard JIS P 8210, the tear factor (relative tearing strength) is defined by the following formula:

$$\text{Tear factor} = \\ \text{Tearing Strength [gf]} / \text{basis weight of test sheet [g/m}^2\text{]} \times 100$$

Figure 3:
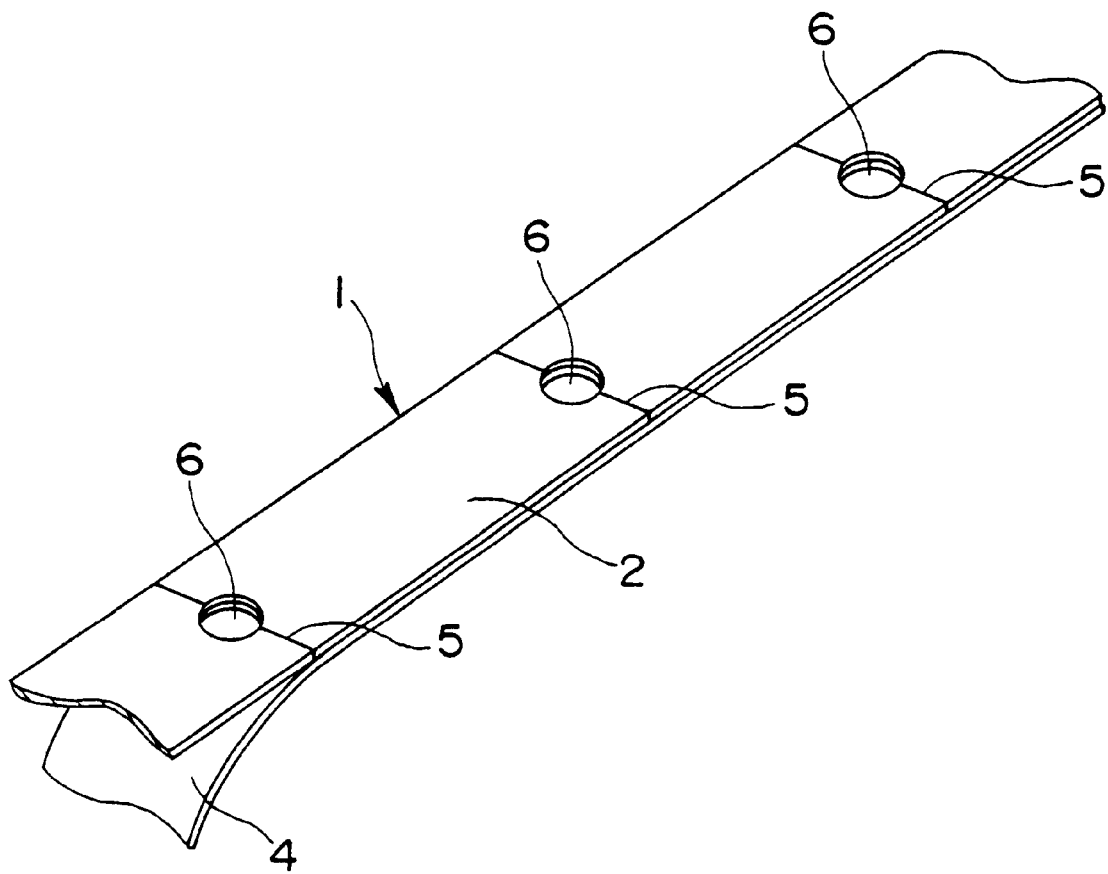
FIG. 3 is a perspective view showing a specific embodiment of a binding tape according to the present invention.

FIG. 3 is a perspective view of an example construction of a binding tape according to the present invention. As shown in this drawing, a binding tape 1 is manufactured from a binding tape paper 2, as described previously above. The binding tape is used by cutting the binding tape paper 2 such that the machine direction MD of the binding tape paper 2 is directed to the lengthwise direction of the respective binding tape 1.

Cutting lines 5 are formed in the binding tape 1 in the cross direction thereof at prescribed distances along the lengthwise direction of the binding tape 1. The distance may be changed in accordance with the type of documents to be bound. Further, through holes 6 are formed in the binding tape 1 roughly at the center of the respective cutting lines 5. These through holes 6 may be used, for example, as tape feeding holes by a binding machine to automatically feed the binding tape 1.

As described above, the binding tape 1 has a high strength. Namely, the binding tape 1 is formed by cutting the binding tape paper 2 having a large breaking length LMD, a large length to breadth breaking strength ratio LMD/LCD and a high tear factor (relative tearing strength) as described above such that the machine direction of the binding tape 2 defines lengthwise direction of the binding tape 1. Therefore, the respective binding tape 1 can have a high strength and it is difficult to tear or break in the same manner as the binding tape paper 2 which is the raw material of the binding tape 1.

EXAMPLES

Next, descriptions of the examples will be given.

Example 1

As described below, a binding tape according to the present invention was obtained by manufacturing a composite paper in accordance with the following steps to form a binding tape paper according to the present invention, applying a pressure sensitive adhesive layer to one surface thereof, and then sticking a release sheet to such pressure sensitive adhesive layer. The conditions of the respective steps were as follows.

1. Manufacture of the Composite Paper

Wood pulp (soft wood:NBKP having beating degree of 70 SR) at 53 parts by weight is combined with polyester fiber (1.5 deniers×5 mm) at 47 parts by weight to obtain a slurry. The epoxy resin (epichlorohydrine-based resin) acting as a wet strength agent is added to the slurry for the amount of 1.0 parts per weight with respect to 100 parts by weight of wood pulp, to obtain a base paper having basis weight of 55 g/m².

Next, after carrying out size pressing for the base paper, an impregnation fluid of 10 g/m² is applied to the base paper and then the paper is impregnated with the fluid, and then such a base paper is dried. In this regard, it is to be noted that the impregnation fluid was a mixture comprised of 90 parts by weight of denatured acrylic ester (latex) and 10 parts by weight of carboxy denatured polyvinyl alcohol (water retaining agent).

2. Formation of the Pressure Sensitive Adhesive Layer

A copolymer was obtained by combining 68 parts by weight of 2-ethyl hexyl acrylate, 25 parts by weight of butyl acrylate, 5 parts by weight of methylacrylate and 2 parts by weight of acrylic acid. Then, a tackifier (hydrogenated rosin ester) is added at 10 parts by weight for 100 parts by weight of such copolymer to obtain a pressure-sensitive adhesive. Then, this adhesive is applied to one side of the above-described composite paper so as to form a layer having a dry thickness of 20 μm.

3. Release Sheet

The release sheet was manufactured by preparing glassine paper having a basis weight of 64 g/m² and applying a silicon type release agent to one side thereof at a distribution of 0.8 g/m².

STRENGTH MEASUREMENTS

In accordance with the standards defined in the Japanese Industrial Standards JIS P 8113 and JIS P 8210, measurements were carried out to determine the strength of the binding tape paper of Example 1. Further, comparative examples comprised of glassine paper and woodfree paper were measured in the same manner. The results of such measurements are listed in Table 1 attached to the specification.

As shown in the attached Table 1, in comparison with the comparative examples comprised of glassine paper and woodfree paper, the binding tape paper of Example 1 has a large tensile strength and breaking length (fracture length) in the machine direction MD. Accordingly, the length to breadth breaking length ratio LMD/LCD has a large value that is 2.5 or higher.

Furthermore, in comparison with the comparative examples, the binding tape paper in Example 1 has a large tear factor (relative tearing strength) not only in the machine direction MD but also in the cross direction CD of the binding tape paper.

Example 2

The binding tape paper of Example 1 was cut into strips each having a wide of 6 mm such that the machine direction MD of the binding tape is aligned with the lengthwise direction of the respective strip.

Using this binding tape, a binding operation in which 10 sheets of woodfree paper (60 g/m²) are bound together was continuously carried out by an automatic binding machine. As a result, it was confirmed that the binding operation could be carried out without any trouble and no breakage of the binding tape occurred.

As described above, the present invention makes it possible to provide a binding tape and binding tape paper which are strong and resistant to breakage in addition to the advantage of paper binder that is easy to dispose of.

Finally, it is to be noted that many changes and additions may be made to the embodiments described above without departing from the scope and spirit of the invention as defined by the appended claims.

TABLE 1

| Measured Item | Direction | Example 1 | Glassin Paper | Woodfree Paper |
|---|---|---|---|---|
| Basis Weight [g/m²] | — | 64.6 | 61.1 | 65.5 |
| Tensil Strenght [kgf/15 mm] | MD | 10.22 | 8.86 | 8.21 |
| Tensil Strength [kgf/15 mm] | CD | 2.69 | 5.06 | 3.60 |
| Breaking Length $L_{MD}$ [km] | MD | 10.55 | 9.67 | 8.36 |
| Breaking Length $L_{CD}$ [km] | CD | 2.78 | 5.52 | 3.66 |
| Length to Breadth Breaking Strength Ratio $L_{MD}/L_{CD}$ | — | 3.8 | 1.75 | 2.28 |
| Tearing Strength [gf] | MD | 104 | 33 | 38 |
| Tearing Strength [gf] | CD | more then 150 | 38 | 45 |
| Tear Factor | MD | 16.1 | 54 | 58 |
| Tear Factor | CD | more then 200 | 62 | 69 |

MD: Machine Direction
CD: Direction Orthogonal to Machine Direction

What is claimed is:

1. A binding tape paper which is formed from a composite paper, said composite paper including 30–70 parts by weight of pulp; and 30–70 parts by weight of synthetic resin fibers having a fineness of 0.4–3.0 deniers and a fiber length of 3–10 mm, wherein the machine direction of the composite paper defines the lengthwise direction of the binding tape paper and wherein the tear factor in the direction orthogonal to the machine direction is greater than or equal to 100 and the breaking length in the machine direction is 8 km or higher.

2. The binding tape paper as claimed in claim 1, wherein the composite paper is impregnated with or coated with an organic compound for increasing its strength, the organic compound being selected from the group consisting of acrylic resin, acrylic ester, vinylacetate resin, polyurethane resin, polyamide resin, polyvinyl alcohol, vinyl chloride resin, styrene-butadiene rubber, nitril-butadiene rubber, methyl methacrylate-butadiene rubber, rosins, gelatin, starch, and mixtures thereof.

3. The binding tape paper as claimed in claim 1, wherein the synthetic resin fibers are comprised of polyester resins which are selected from the group consisting of polyethylene terephthalate, polybutylene terephthalate, and mixtures thereof.

4. The binding tape paper as claimed in claim 1, wherein the ratio LMD/LCD between the breaking length in the machine direction LMD and the breaking length in the cross direction LCD which is orthogonal to the machine direction is greater than or equal to 2.5.

5. A binding tape paper which is formed from a composite paper, said composite paper including 30–70 parts by weight of pulp; and 30–70 parts by weight of synthetic resin fibers having a fineness of 0.4–3.0 deniers and a fiber length of 3–10 mm, wherein the machine direction of the composite paper defines the lengthwise direction of the binding tape paper and wherein the tear factor in the direction orthogonal to the machine direction is greater than or equal to 100 and the ratio LMD/LCD between the breaking length in the machine direction LMD and the breaking length in the cross direction LCD which is orthogonal to the machine direction is greater than or equal to 2.5.

6. The binding tape paper as claimed in claim 5, wherein the composite paper is impregnated with or coated with an organic compound for increasing its strength, the organic compound being selected from the group consisting of acrylic resin, acrylic ester, vinylacetate resin, polyurethane resin, polyamide resin, polyvinyl alcohol, vinyl chloride resin, styrene-butadiene rubber, nitril-butadiene rubber, methyl methacrylate-butadiene rubber, rosins, gelatin, starch, and mixtures thereof.

7. The binding tape paper as claimed in claim 5, wherein the synthetic resin fibers are comprised of polyester resins which are selected from the group consisting of polyethylene terephthalate, polybutylene terephthalate, and mixtures thereof.

8. A binding tape, comprising:
 a binding tape paper which is formed from a composite paper including 30–70 parts by weight of pulp, and 30–70 parts by weight of synthetic resin fibers having a fineness of 0.4–3.0 deniers and a fiber length of 3–10 mm, wherein the machine direction of the composite paper defines the lengthwise direction of the binding tape paper, and wherein the tear factor in the direction orthogonal to the machine direction is greater than or equal to 100 and the breaking length in the machine direction is 8 km or higher; and
 a pressure sensitive adhesive layer provided on one side of the binding tape paper,
wherein the binding tape is formed by cutting the binding tape paper so that the machine direction of the binding tape paper is directed to the lengthwise direction of the binding tape.

9. The binding tape as claimed in claim 8, further comprising a release sheet attached to the pressure-sensitive adhesive layer.

10. A binding tape, comprising:
 a binding tape paper which is formed from a composite paper including 30–70 parts by weight of pulp, and 30–70 parts by weight of synthetic resin fibers having a fineness of 0.4–3.0 deniers and a fiber length of 3–10 mm, wherein the machine direction of the composite paper defines the lengthwise direction of the binding tape paper, and wherein the tear factor in the direction orthogonal to the machine direction is greater than or equal to 100, and wherein the breaking length in the machine direction is 8 km or higher and the ratio LMD/LCD between the breaking length in the machine direction LMD and the breaking length in the cross direction LCD which is orthogonal to the machine direction is greater than or equal to 2.5; and
 a pressure sensitive adhesive layer provided on one side of the binding tape paper,
wherein the binding tape is formed by cutting the binding tape paper so that the machine direction of the binding tape paper is directed to the lengthwise direction of the binding tape.

11. The binding tape as claimed in claim 10, further comprising a release sheet attached to the pressure-sensitive adhesive layer.

12. The binding tape paper as claimed in claim 10, wherein the composite paper is impregnated with or coated with an organic compound for increasing its strength, the organic compound being selected from the group consisting of acrylic resin, acrylic ester, vinylacetate resin, polyurethane resin, polyamide resin, polyvinyl alcohol, vinyl chloride resin, styrene-butadiene rubber, nitril-butadiene rubber, methyl methacrylate-butadiene rubber, rosins, gelatin, starch, and mixtures thereof.

13. The binding tape paper as claimed in claim 10, wherein the synthetic resin fibers are comprised of polyester resins which are selected from the group consisting of polyethylene terephthalate, polybutylene terephthalate, and mixtures thereof.

* * * * *